United States Patent
Prigent et al.

(10) Patent No.: US 9,765,799 B2
(45) Date of Patent: Sep. 19, 2017

(54) HYDROSTATIC TRANSMISSION DEVICE ENSURING GOOD DRIVEABILITY

(75) Inventors: André Prigent, Saintines (FR);
Romain Gostomski, Granges (FR);
Jean Heren, Margny les Compiegne (FR)

(73) Assignee: Poclain Hydraulics Industrie, Verberie (FR)

( * ) Notice: Subject to any disclaimer, the term of this patent is extended or adjusted under 35 U.S.C. 154(b) by 676 days.

(21) Appl. No.: 14/237,589

(22) PCT Filed: Jul. 26, 2012

(86) PCT No.: PCT/FR2012/051779
§ 371 (c)(1),
(2), (4) Date: Oct. 30, 2014

(87) PCT Pub. No.: WO2013/021113
PCT Pub. Date: Feb. 14, 2013

(65) Prior Publication Data
US 2015/0047334 A1    Feb. 19, 2015

(30) Foreign Application Priority Data
Aug. 8, 2011  (FR) ...................................... 11 57248

(51) Int. Cl.
*F15B 11/22* (2006.01)
*F16H 61/4043* (2010.01)
(Continued)

(52) U.S. Cl.
CPC .......... *F15B 11/22* (2013.01); *F16H 61/4043* (2013.01); *F16H 61/444* (2013.01); *F16H 61/448* (2013.01); *B60K 17/356* (2013.01)

(58) Field of Classification Search
CPC .... F16H 61/452; F16H 61/444; F16H 61/448; F16H 61/4043
See application file for complete search history.

(56) References Cited

U.S. PATENT DOCUMENTS 3,348,624 A * 10/1967 Just ...................... B60F 3/0007
                                                           180/305
6,354,392 B1 * 3/2002 Cousin ................... B60K 17/10
                                                           180/242
(Continued)

FOREIGN PATENT DOCUMENTS

EP    1 004 469 A2    5/2000
EP    2 216 194 A1    8/2010
(Continued)

OTHER PUBLICATIONS

International Search Report for corresponding International Application No. PCT/FR2012/051779 with English translation mailed on Nov. 14, 2012.

*Primary Examiner* — Thomas E Lazo
*Assistant Examiner* — Matthew Wiblin
(74) *Attorney, Agent, or Firm* — Bookoff McAndrews, PLLC

(57) ABSTRACT

The present disclosure is directed to a hydrostatic transmission apparatus including a pump, a first motor, and a second motor having two elementary motors. Each of the motors having first and second enclosures for feed/discharge. In work mode and in road mode, the second enclosure of the first elementary motor of the second motor and the first enclosure of the first motor are connected together in series, the second enclosure of the first motor being connected to the second port of the pump, and the second enclosure of the second elementary motor of the second motor is connected to the second port of the pump. In work mode, the first enclosure of each of the two elementary motors of the third motor is connected to the first port of the pump.

19 Claims, 5 Drawing Sheets

(51) Int. Cl.
*F16H 61/444* (2010.01)
*F16H 61/448* (2010.01)
B60K 17/356 (2006.01)

(56) References Cited

U.S. PATENT DOCUMENTS

| | | | |
|---|---|---|---|
| 8,307,752 B2* | 11/2012 | Ryyppo | F03C 1/045 |
| | | | 91/498 |
| 2007/0079610 A1* | 4/2007 | Lucienne | B60K 17/10 |
| | | | 60/487 |
| 2007/0125447 A1* | 6/2007 | Alfthan | A01G 23/095 |
| | | | 144/343 |
| 2009/0014225 A1* | 1/2009 | Link | F16H 61/4043 |
| | | | 180/197 |
| 2011/0142632 A1* | 6/2011 | Stoltz | F03D 9/001 |
| | | | 416/36 |

FOREIGN PATENT DOCUMENTS

| | | | | |
|---|---|---|---|---|
| FR | 2 940 671 A1 | 7/2010 | | |
| FR | EP 2216194 A1 * | 8/2010 | | F16H 61/448 |

* cited by examiner

HYDROSTATIC TRANSMISSION DEVICE ENSURING GOOD DRIVEABILITY

CROSS-REFERENCE TO RELATED APPLICATIONS

This application is a National Stage filing under 35 U.S.C. §371 of International Application No. PCT/FR2012/051779, filed Jul. 26, 2012, which claims priority to French Patent Application No. FR1157248, filed Aug. 8, 2011, the contents of each of which are incorporated by reference herein.

The invention relates to hydraulic apparatus used for driving vehicles having at least one front drive member and at least one rear drive member, and the invention relates more particularly to vehicles that travel over difficult terrain such as uphill or downhill slopes, slippery or stony surfaces, or banked-up terrain. The drive members may be wheels, tracks, etc. In the remainder of the document below and for reasons of simplicity, reference is made to wheels, which are the drive members that are encountered most frequently on vehicles, it being understood that any mention of a wheel should be understood as also applying to any drive member suitable for providing a vehicle with at least part of its drive.

In known manner, in order to procure good drivability for vehicles, in particular on difficult terrain, it is possible to use "Twin-Lock" apparatus (Twin-lock is a registered trademark of Poclain Hydraulics). "Twin-lock" apparatus is defined herein as being hydrostatic transmission apparatus including:

a hydraulic pump with two main ports;
a first hydraulic motor;
a second hydraulic motor including at least a first elementary motor and a second elementary motor, each elementary motor and the first motor having first and second enclosures for feeding fluid to the motor and for discharging fluid therefrom;

and in which:
the first enclosure of each of the two elementary motors of the second motor may be connected to a first main port of the pump;
the second enclosure of the first elementary motor of the second motor and the first enclosure of the first motor may be connected together in series via a first series duct, the second enclosure of the first motor being connected to the second main port of the pump; and
the second enclosure of the second elementary motor of the second motor is connected to the second main port of the pump;
the connections being either established or else interrupted as a function of the operating mode of the apparatus.

The Twin-lock apparatus thus includes two drive circuits that are connected in parallel to the main ports of the pump, the first circuit essentially including the first elementary motor that is connected in series to the first motor, and the second circuit essentially including the second elementary motor.

In Twin-lock apparatus, the second motor is a motor that is distinct from the first motor, i.e. it has an outlet member that is mechanically independent in rotation from the outlet member of the first motor. In general, the first and second motors are coupled to distinct wheels of the vehicle.

In this document, the components being "connected" together or "interconnected" when the apparatus is in a particular operating mode means that, in that operating mode, they are put into communication with each other via ducts, valves, and optionally other hydraulic components but without any pump or any motor being interposed on the connection.

Twin-lock apparatus offers a tried and tested solution for driving a vehicle that has at least one front drive member and at least one rear drive member. It makes it possible to synchronize the front and rear drive members of the vehicle, and thus to avoid any spin under most circumstances. An example of Twin-lock apparatus is given by Document EP 0 547 947.

In this document, the term "series duct" should be understood as being a duct that has no branches leading off from it (it being, nevertheless, possible for small amounts of fluid to be drawn off from it or to be added to it), at least in a "synchronization" configuration, in which the motors (main or elementary motors) interconnected by the series duct are synchronized. However, the circuit may have valves or equipment that enable it to be used in configurations other than the above-indicated synchronization configuration.

Most vehicles equipped with Twin-lock apparatus are designed to have a "work" operating mode, in which they travel at relatively slow speeds, and a "road" operating mode, in which they travel, on the road, at much higher speeds. Since such vehicles are driven by the hydraulic motors of the Twin-lock apparatus, going over from the work mode to the road mode is obtained mainly by bypassing one or the other of the above-mentioned drive circuits, thereby reducing the cylinder capacity of the motors that drive the wheels and thus increasing the speed.

The work mode naturally corresponds to the mode in which all of the drive circuits (and in particular the two elementary motors) are used to produce driving torque. Conversely, the road mode thus corresponds to a mode in which at least one of the drive circuits, and thus at least one of the elementary motors of the second motor is bypassed. In this situation, the same pressure is applied to both of the ends of the bypassed circuit, so that the motor(s) of that circuit do not generate any torque.

However, bypassing a drive circuit requires certain precautions to be taken. If one of the elementary motors is bypassed while the first enclosure of the elementary motor is connected to the first main port of the pump, and if the delivery pressure is applied to said first main port of the pump, then the delivery pressure also applies to the second enclosure of the bypassed elementary motor. Unfortunately, an elementary motor cannot operate in such a mode (with high pressure being applied simultaneously both to its feed enclosure and to its discharge enclosure): the elementary motor heats up, seizes, and deteriorates quickly.

To avoid this problem in vehicles driven by Twin-lock apparatus, the high delivery pressure of the pump is applied in work mode (and thus, in general, in the preferred direction of flow of the fluid) not to the first enclosures of the elementary motors of the second motor, but rather on the other side, i.e. respectively to the second enclosure of the first motor and to the second enclosure of the second elementary motor of the second motor.

In addition, it is has been observed that, in such vehicles, certain problems of stability on uphill slopes can arise under certain unfavorable adhesion (grip) conditions. When the vehicle is on a steep slope, weight is transferred back from the front and the vehicle is therefore less capable of transmitting a force to the ground via the front wheels. Said vehicle thus presses down continuously onto the rear wheels.

Since this capacity to transmit force to the ground is directly related to the weight of the vehicle and to its coefficient of adhesion, whenever there is a sudden drop in the coefficient of adhesion (a stone rolling under the wheel, etc.), the driving torque shifts suddenly to the corresponding rear wheel. This sudden increase in the torque on the rear wheel generates a front-end lifting moment which in turn leads to further weight transfer from the front wheel. This additional weight transfer from the front wheel further reduces the capacity of the front wheel to transmit a force to the ground, and a further pressure is put on the rear wheel. The vehicle then undergoes a self-sustained oscillation movement that can often be interrupted only when the vehicle is brought to a complete standstill.

Various types of known apparatus have been proposed to limit or to avoid such behavior of the vehicle. Such apparatus essentially serves to reduce the torque of the front motor(s) in order to obtain an anti-spin effect.

Unfortunately, the various solutions proposed have never made it possible to remove the above-indicated risk of oscillations entirely.

Therefore, a first object of the invention is to provide hydraulic apparatus including a circuit of the Twin-lock type and that makes it possible both to procure good drivability and also to accommodate a "road" mode with a small cylinder capacity and a "work" mode with a larger cylinder capacity, the apparatus further having stable motor behavior, including on a steep uphill slope, in particular when one of the wheels starts to slip.

This object is achieved by hydrostatic transmission apparatus including:
 a hydraulic pump with two main ports;
 a first hydraulic motor; and
 a second hydraulic motor including at least a first elementary motor and a second elementary motor, each elementary motor and the first motor having first and second enclosures for feeding fluid to the motor and for discharging fluid therefrom;
the apparatus having at least two operating modes referred to as "work" mode and "road" mode, in which modes:
 the second enclosure of the first elementary motor of the second motor and the first enclosure of the first motor are connected together in series via a first series duct, the second enclosure of the first motor being connected to the second main port of the pump; and
 the second enclosure of the second elementary motor of the second motor is connected to the second main port of the pump;
in which apparatus, in "work" mode, the first enclosure of each of the two elementary motors of the second motor is connected to a first main port of the pump;
 the apparatus further having isolation means that, in "road" mode, are suitable for:
 isolating the first enclosures of the first and second elementary motors of the second motor from each other;
 putting a "feed" one of said first enclosures into communication with the first main port of the pump in such a manner as to feed one of the elementary motors of the second motor; and
 putting the other one of said first enclosures, referred to as the "bypass" first enclosure into communication with the second main port of the pump via a first bypass duct in such a manner as to bypass the other one of the elementary motors of the second motor.

In implicit manner in this apparatus, the pump must be arranged in such a manner that the delivery pressure of the pump can be applied to the first port of the pump. This applies in particular if the pump is reversible.

Unlike in the above-explained prior practice, and instead of feeding the Twin-lock apparatus by applying the delivery pressure of the pump respectively to the second enclosure of the first motor and to the second enclosure of the second elementary motor of the second motor, the invention makes it possible to feed the Twin-lock apparatus by applying the delivery pressure of the pump to the first enclosures of the two elementary motors.

Since the apparatus makes it possible to feed the rear wheel of the vehicle first, when said rear wheel is driven by the second motor, the problem of self-sustained oscillations that is encountered in prior Twin-lock apparatus is avoided.

In such prior apparatus, since the two first enclosures of the two elementary motors are connected jointly to the main port of the pump, these two enclosures communicate in practice inside the motor itself, and the motor then has only one external feed/discharge coupling that is common to said two first enclosures.

The invention thus aims to change this usual arrangement of the second motor of Twin-lock apparatus by incorporating isolation means into it, making it possible, in road mode, to isolate the first enclosures of the two elementary motors from each other in such a manner as to put them separately into communication respectively with the two main ports of the pump. The second motor of apparatus of the invention is thus a motor having four (or more) external couplings, instead of the three in conventional Twin-lock apparatus.

Two arrangements of the apparatus are possible for the road mode, depending on the desired drivability:

In a first embodiment, in road mode, it is the second elementary motor that is bypassed. The feed first enclosure is then the first enclosure of the first elementary motor. The first elementary motor and the first motor thus deliver drive in the road mode and thus synchronize the wheels via the first series duct.

In a second embodiment and conversely, in road mode, it is the first elementary motor connected to the first motor that is bypassed. The feed first enclosure is then the first enclosure of the second, elementary motor. The second elementary motor is then the only motor driving the apparatus; there is therefore no synchronization of the wheels.

In addition, in order to enable a large speed difference to be obtained between road mode and work mode, it is desirable for the second motor to include not only two elementary motors, but rather three (or more) elementary motors. Thus, in an embodiment, the second motor further includes a third elementary motor having feed/discharge first and second enclosures;
 the first enclosure of the third elementary motor is connected to the first enclosure of the first elementary motor; and
 the second enclosure of the third elementary motor is connected to the second main port of the pump;

In this embodiment, the feed and discharge of the second motor preferably take place via four external feed/discharge couplings only.

In an apparatus according to the invention, various arrangements may be considered for improving the braking capacities of the vehicle on which the apparatus is installed.

Firstly, as indicated above, in road mode, the number of active motors is reduced, thereby, a priori, reducing the hydrostatic braking capacity accordingly. However, in an advantageous improvement of the invention, the presence of the bypass duct makes it possible, subject to making a minor alteration, to have a hydrostatic braking capacity that is considerably increased. For this purpose, it suffices to make provision for the apparatus to further include a pressure reducer interposed on the first bypass duct and that prevents pressure from rising in the portion of said first bypass duct that is connected to the second main port of the pump. In a braking situation, in known manner, the pressure is inverted in the circuits, the higher pressure being at the second main port of the pump. Under such circumstances, while the pressure at the second main port of the pump is higher than the pressure at the first port, the drop in pressure due to the pressure reducer causes a relatively low pressure to prevail in the bypass first enclosure (which pressure is determined by setting the pressure reducer). The pressure difference thus generated across the terminals of the elementary motor fed by the bypass first enclosure thus makes it possible for this motor to deliver braking torque that is substantial for braking, which torque is in addition to the braking torque delivered by the other elementary motor.

Secondly, under braking conditions, the presence of an inverted pressure differential across the terminals of the elementary motors causes a risk to arise of wheel spin and thus of reversal of the direction of rotation of the wheels if the wheels go onto a slippery or stony surface. One of the wheels might then start rotating the direction opposite from the direction in which the vehicle is traveling. To avoid this, one possibility consists in make provision for the apparatus to include a check valve interposed on the first bypass duct and preventing flow of fluid through this duct from the bypass first enclosure. This check valve thus prevents any rotation in the direction opposite to the direction in which the elementary motor connected to the first bypass duct is operating.

The apparatus of the invention may be used for providing drive for various vehicles, including various numbers of drive members. Above, only a single front drive member and a single rear drive member have been mentioned.

In an embodiment, the apparatus further includes:
a third hydraulic motor including at least a first elementary motor and a second elementary motor, each elementary motor having first and second enclosures for feeding fluid to the motor and for discharging fluid therefrom;
in which apparatus, both in work mode and in road mode:
the second enclosure of the second elementary motor of the third motor is connected to the second main port of the pump;
in "work" mode, the first enclosure of each of the two elementary motors of the third motor is connected to the first main port of the pump;
in "road" mode, the isolation means are suitable for:
isolating the first enclosures of the first and second elementary motors of the third motor from each other, and, simultaneously,
putting a "feed" one of said first enclosures of the third motor into communication with the first main port of the pump in such a manner as to feed one of the elementary motors; and
putting the other one of said first enclosures, referred to as the "bypass" first enclosure of the third motor into communication with the second main port of the pump via a second bypass duct in such a manner as to bypass the other one of the elementary motors.

The apparatus thus makes it possible to drive three distinct wheels or drive members.

A first variant is provided for a vehicle having only three wheels. In this apparatus, the second enclosure of the first elementary motor of the third motor and the first enclosure of the first motor are connected to each other in series via a second series duct.

A second variant is provided for a vehicle having four wheels. The apparatus then further includes a fourth motor having first and second enclosures for feeding fluid to the motor and for discharging fluid therefrom, and the second enclosure of the first elementary motor of the third motor and the first enclosure of the fourth motor are connected together in series via a second series duct, the second enclosure of the fourth motor being connected to the second main port of the pump.

In the apparatus having a first motor and a third motor, and for improving the behavior under braking conditions, various improvements may be considered:

The apparatus may include a flow divider. This divider may be arranged, in particular, in two manners:

In an embodiment, the flow divider has two inlet ports and one outlet port, the two inlet ports being connected to the second enclosures of the second elementary motor of the second and third motors respectively, and the outlet port being connected to the second main port of the pump, the flow divider being arranged in such a manner as to constrain fluid to flow at an equal flow rate through each of its two inlet ports.

In an embodiment, the flow divider has one inlet port and two outlet ports, the two outlet ports being connected, in the work mode, to the first enclosures of the first and second elementary motors respectively of the second and third motors, and the inlet port is connected to the first main port of the pump, the flow divider being arranged in such a manner as to constrain fluid to flow at an equal flow rate through each of its two outlet ports.

In both cases, the flow divider constrains both wheels (driven respectively by the second and third motors) to rotate at exactly the same speed: This therefore prevents, in particular, any rotation of a wheel in the direction opposite from the direction in which the vehicle is traveling.

The behavior in a braking situation can also be improved when the apparatus further includes an exchange valve circuit having two inlet ports and one outlet port, the two inlet ports being connected to the two main ports of the pump, the outlet port being connected to an overpressure-free reservoir, the exchange valve circuit being suitable for directing to the overpressure-free reservoir fluid that is coming from that one of the main ports of the pump that is at the lower pressure, if the pressure of said fluid exceeds a predetermined value. Such a circuit serves to cause fluid to flow out from the closed circuit, mainly to enable it to cool down by flowing through the overpressure-free reservoir.

The behavior in a braking situation of apparatus including such a circuit is improved if the circuit includes activatable blocking means for blocking the exchange valve, the blocking means being suitable for preventing fluid from being removed by the pump when they are activated. The blocking means are activated naturally in a braking situation. Activation of said means prevents fluid from flowing out from the closed circuit via the exchange valve circuit; this therefore requires the flow rate of fluid passing through the pump to remain relatively high, thereby contributing to maintaining a certain speed for the wheels, and reducing the risk of said wheels locking.

Finally, the invention is preferably incorporated into a vehicle including one rear vehicle mover member and one front vehicle mover member, and apparatus as defined above. In the vehicle, the first motor is preferably coupled to the front mover member, and the second motor is preferably coupled to the rear mover member. The motors may also be coupled the other way round to the mover members.

The invention can be well understood and its advantages appear more clearly on reading the following detailed description of embodiments shown by way of non-limiting example. The description refers to the accompanying drawings, which are diagrammatic views showing various embodiments of apparatus of the invention:

Figure 6:
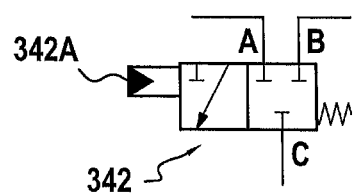
Figure 3:
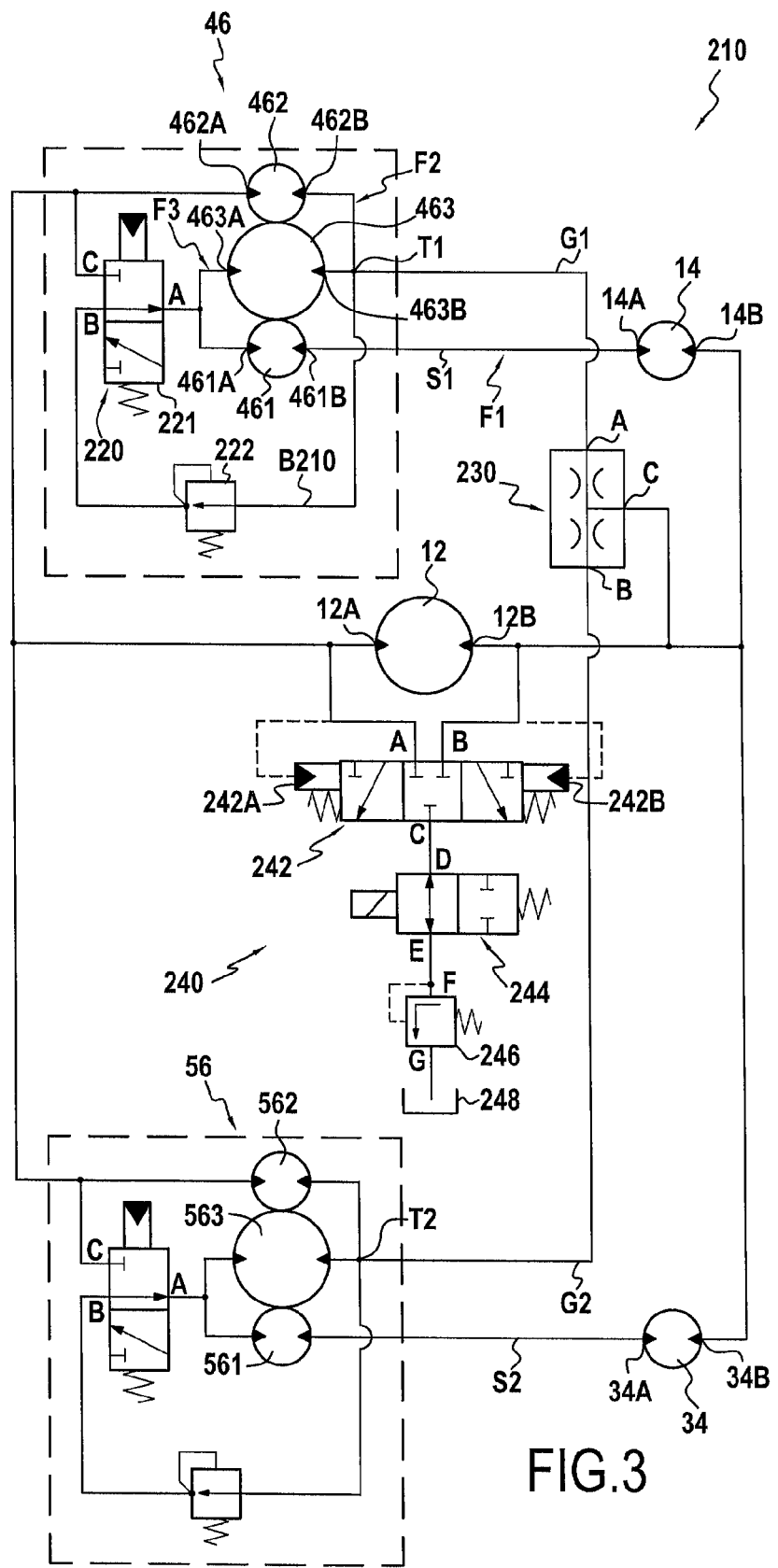
Figure 4:
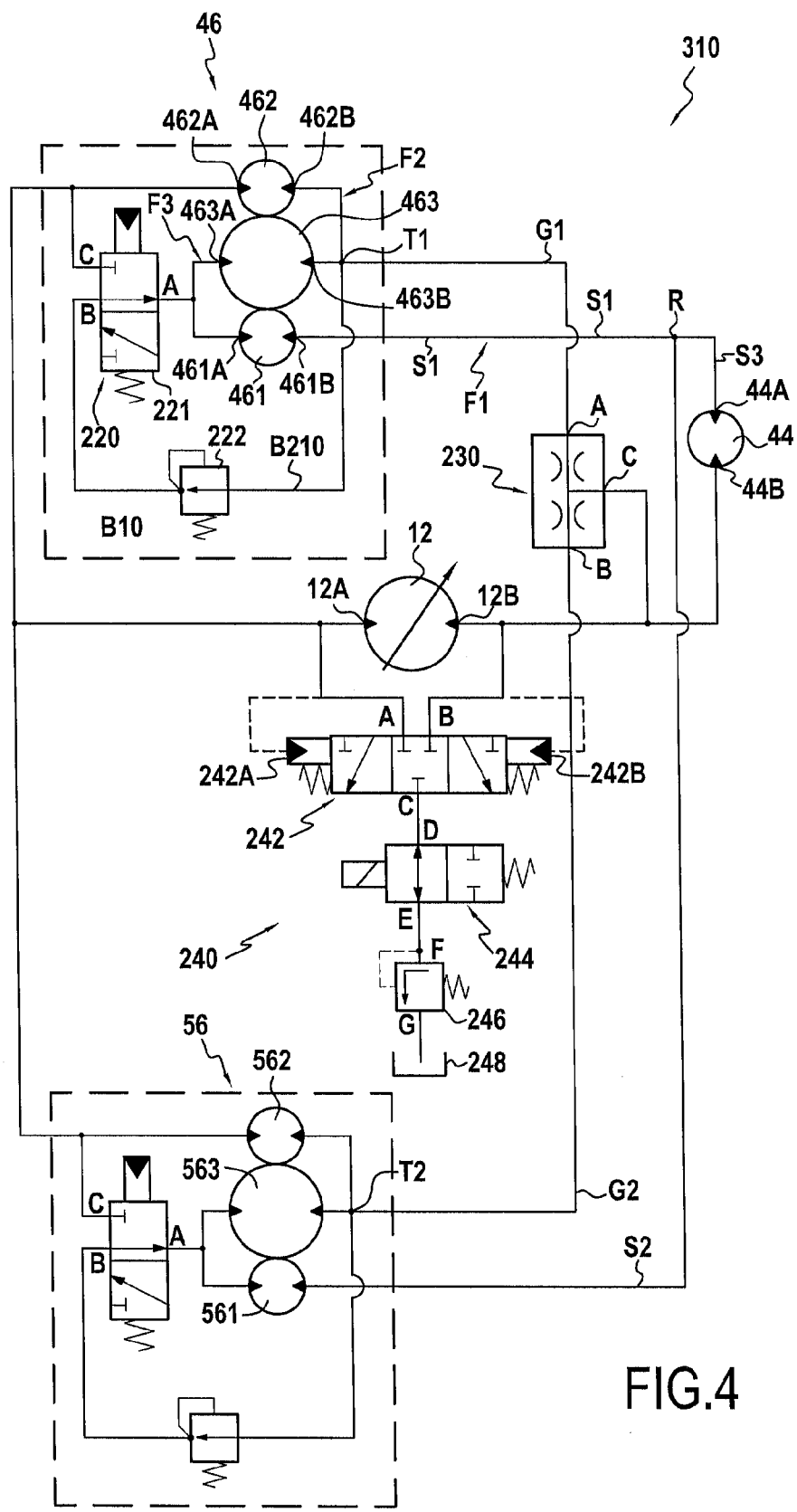
Figure 5:
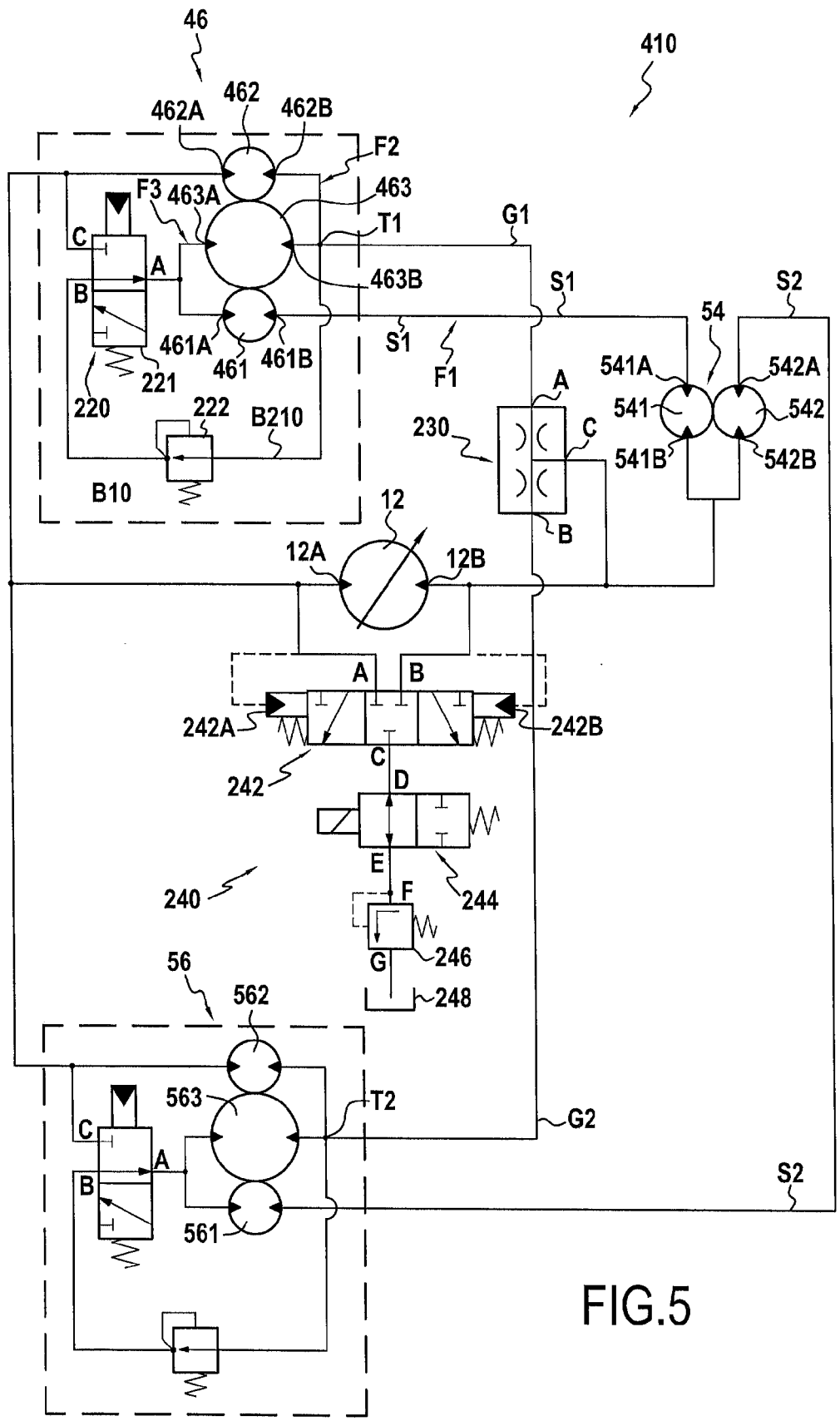

FIGS. 3, 4, and 5 show configurations respectively with four motors and with three motors, the third motor being either a single motor (FIG. 4), or a double motor (FIG. 5); and FIG. 6 shows a variant of a valve of the FIG. 4 circuit.

Figure 1:
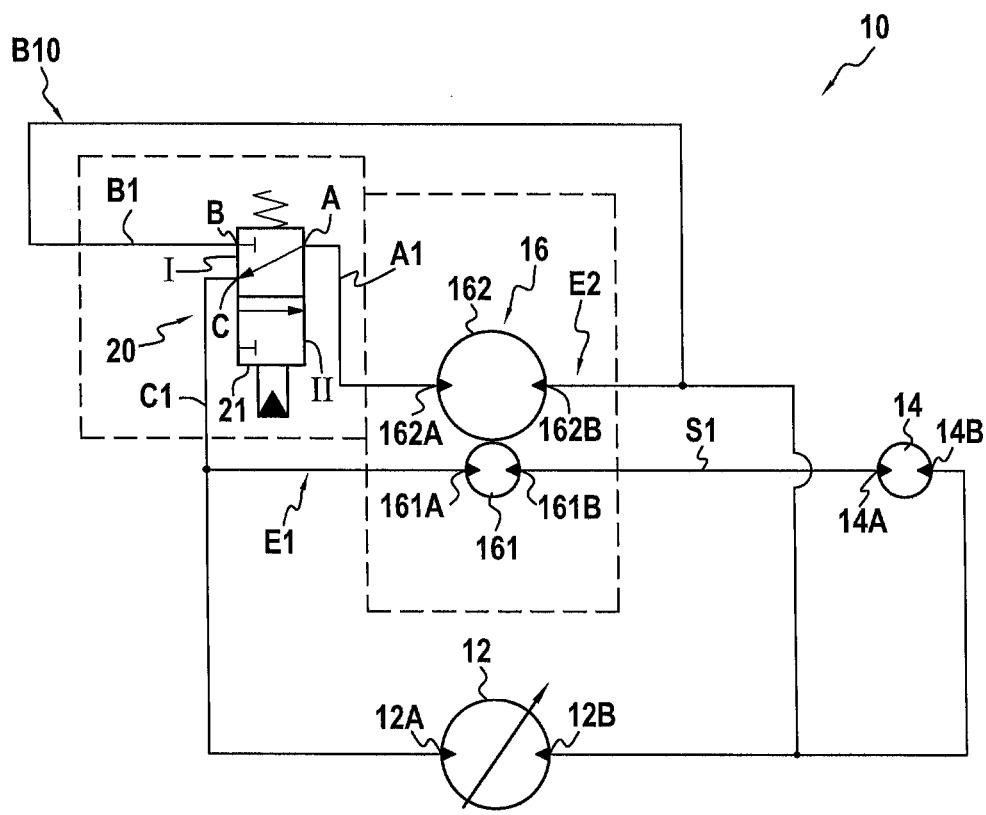
FIG. 1 shows a basic configuration with only two motors.

A first embodiment of hydrostatic transmission apparatus 10 of the invention is described below with reference to FIG. 1.

It is assumed that the apparatus 10 is installed on a vehicle (not shown) having at least one front wheel and at least one rear wheel, enabling the vehicle to be driven. To this end, the apparatus 10 includes a hydraulic pump 12, a first hydraulic motor 14 and a second hydraulic motor 16. In known manner, the pump is designed to be driven by the outlet shaft of an internal combustion engine (not shown). Naturally, the invention could also have been shown in an embodiment in which the pump is driven by an electric motor.

The pump 12 is a reversible pump having a variable delivery rate, and having two ports 12A and 12B. The first port 12A is the delivery port of the pump when said pump is operating normally.

The first motor 14 is a single motor.

The second motor 16 is a multiple motor that has a first elementary motor (161) and a second elementary motor (162). The elementary motors 161 & 162 and the first motor 14 have respective first enclosures 161A, 162A, 14A, and respective second enclosures 161B, 162B, 14B for feeding fluid to the motor and for discharging fluid therefrom.

A first circuit E1 constituted by the first elementary motor 161 and by the first motor 14, and a second circuit E2 essentially constituted by the second elementary motor 162 are connected in parallel to the ports 12A and 12B of the pump 12, the first and second circuits forming a closed circuit in which the fluid circulates.

Therefore, in the first circuit E1, the second enclosure 161B of the second elementary motor 161 is connected via a series duct S1 to the first enclosure 14A of the first motor 14. In addition, the second enclosure 14B of the first motor and the second enclosure 162B of the second elementary motor 162 are connected to the second main port (12B) of the pump 12.

The motor 16 has four external couplings for fluid feed/fluid discharge. These couplings are connected to respective ones of the enclosures of the first and second elementary motors and bear the same references as those enclosures. It should be noted in particular that, in the motor 16, all of the various enclosures of the two elementary motors are isolated from one another in pairs due to the way in which the motor 16 is arranged. For this purpose, the motor 16 includes isolation means, in particular for isolating the enclosures 161A and 162A from each other.

In addition, the apparatus 10 has isolation means 20 suitable for acting, depending on the operating mode, to isolate the first enclosures 161A, 162A from each other or not to isolate said first enclosures 161A, 162A from each other.

The first enclosure 161A of the first elementary motor is connected continuously to the first main port 12A of the pump 12.

Conversely, the first enclosure 162A of the second elementary motor 162 is connected to one or to the other of the ports 12A or 12B as a function of the position of a controllable distributor 21. Therefore, the first enclosure 161A of the second elementary motor 162 constitutes the feed first enclosure in the meaning of the invention, whereas the first enclosure 162A of the second elementary motor 162 constitutes the bypass first enclosure.

The isolation means are arranged in such a manner as to enable the enclosure 162A to be connected selectively to the port 12A or to the port 12B. The isolation means indeed include the two-position controllable distributor 21 that is arranged in such a manner as to make it possible to connect the bypass first enclosure 162A selectively to one or to the other of the ports 12A or 12B of the pump, depending on whether the apparatus is in work mode or in road mode.

This distributor 21 has three ports, namely a downstream port A connected to the first port 162A of the second sub-motor (via a duct A1), and two upstream ports B and C that are connected to respective ones of the two main ports 12A, 12B of the pump via connection ducts B10 and C1.

In this embodiment, the duct B10 comprises a single portion B1.

The distributor 21 also has two positions I and II:

In position I, the apparatus 10 operates in work mode: ports A and C are put into communication with each other, whereas port B is isolated, so that, via the duct C1, the enclosure 162A is put into communication with the port 12A of the pump. The delivery pressure of the pump, which pressure is applied to its port 12A, is thus applied in the two enclosures 161A and 162A. The two circuits E1 and E2 are active, and all of the motors take part in driving the vehicle.

In position II, the apparatus 10 operates in road mode: ports A and B are put into communication with each other, whereas C is isolated, so that the second elementary motor 162 is bypassed. Only the first circuit E1 thus contributes to driving the vehicle.

Thus, the arrangement of the apparatus 10 makes it possible to bypass the second circuit E2 in sound manner, i.e. without the elementary motor 162 being subjected simultaneously, in both of its enclosures, to the (high) delivery pressure of the pump 12.

Figure 2:
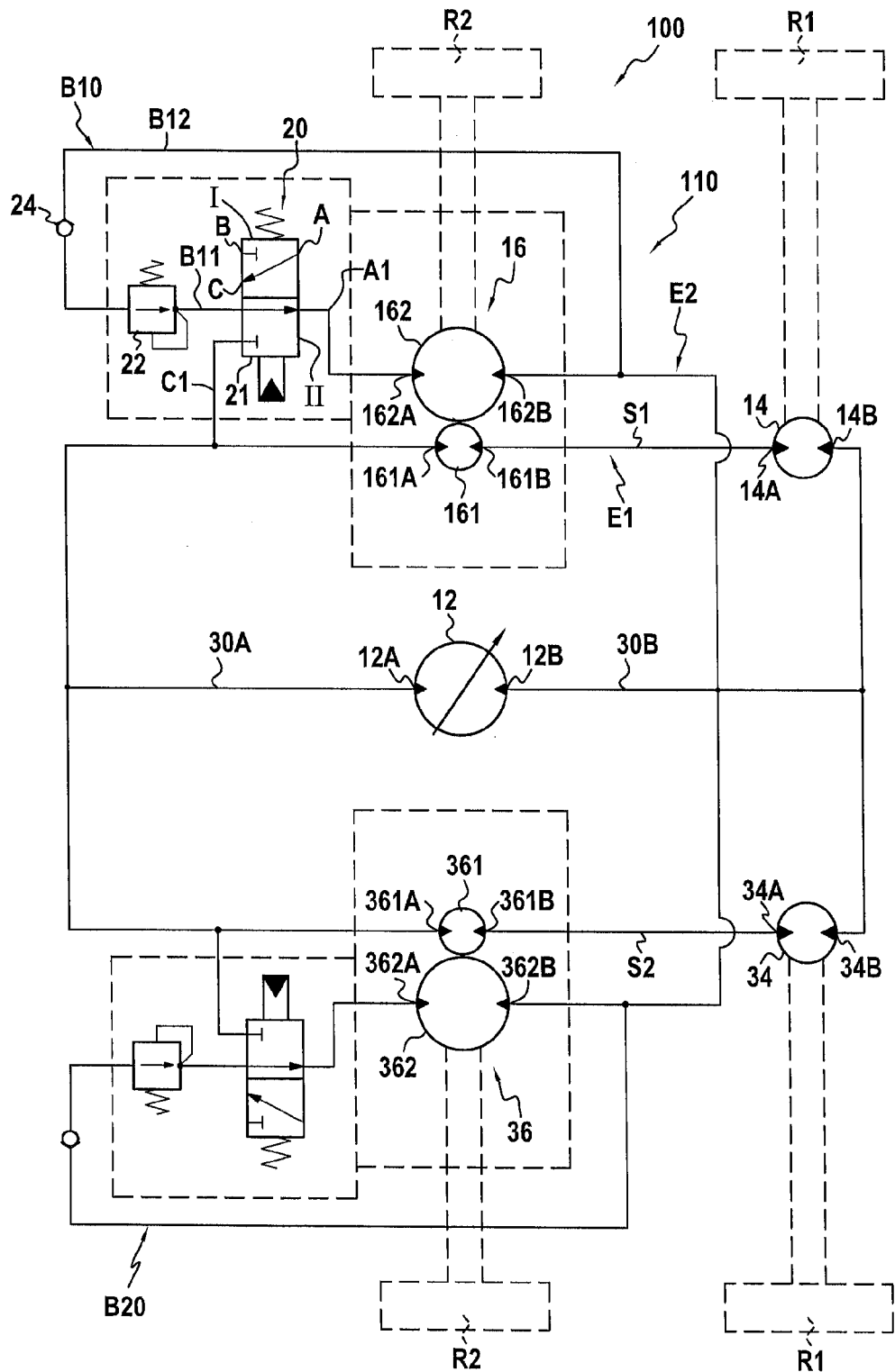
FIG. 2 shows a configuration with four motors driving four wheels.

FIG. 2 shows a vehicle 100 on which a hydrostatic transmission apparatus 110 of the invention is installed.

In this figure, as in FIGS. 3 and 4, elements that are identical or similar to elements of the first embodiment, or indeed that have the same function as such elements, bear the same references and are not described again.

The vehicle 100 is a vehicle having four driven wheels, namely two front wheels R1, and two rear wheels R2. Its wheels are driven by the apparatus 110 that has first and second motors 14 and 16 that are identical to the first and second motors of the apparatus 10, as well as a third motor 36 and a fourth motor 34.

The first and fourth motors 14 and 34 are coupled to respective ones of the left and right front wheels R1. The second and third motors 16 and 36 are coupled to respective ones of the left and right rear wheels R2.

The apparatus 110 is arranged symmetrically for both sides of the vehicle. The pump 12 and the ducts 30A and 30B that are connected to the ports 12A and 12B of the pump are not duplicated; conversely, all of the other components of the apparatus 110 are duplicated.

Given that the apparatus 110 has an architecture that is symmetrical between the left and the right, only the "left" side of the apparatus 110 is described below, namely the side that contains the components that serve the left side of the vehicle (and in particular the first and second motors 14 and 16).

It should, however, be noted that the second enclosure 361B of the first elementary motor 361 of the third motor and the first enclosures 34A of the fourth motor 34 are connected together in series via a second series duct S2, the second enclosure 34B of the fourth motor being connected to the second main port 12B of the pump 12.

The left portion of the apparatus 110 (including the components that are common to the left and right portions, namely essentially the pump 12 and the ducts 30A and 30B) is identical to the apparatus 10, except that two additional components have been added, namely a pressure reducer 22 and a check valve 24.

The pressure reducer 22 is interposed on the duct B10, which duct it splits into an "upstream" portion B11 that extends from the port B of the distributor 21 to the pressure reducer 22, and a "downstream" portion B12 that extends from the pressure reducer 22 to the port 12B.

In order to enable the role of the pressure reducer 22 to be understood more clearly, the distributor 21 has been shown in the road mode (position II). In this operating mode, in normal forward operation (i.e. while the motors are acting as motors rather than as pumps), the fluid at the ports 162A and 162B of the second elementary motor 162 is brought to the pressure of the port 12B of the pump (admission pressure of the pump, which pressure is usually about 20 bars).

Conversely, during braking, the motors 14 and 16 act as pumps and cause the pressure in the port 12B of the pump to rise. In the absence of a pressure reducer 22, the elementary motor 162 remains in the bypass situation and delivers zero output torque.

The reducer 22 is interposed on the bypass duct B10 (first bypass duct). The reducer remains without any effect on the fluid so long as the pressure in the downstream portion B12 of the bypass duct B10 (portion situated downstream from the reducer 22) remains at a predetermined pressure, of about 60 bars. Conversely, as soon as this pressure tends to exceed this value, the reducer limits the flow rate passing through it, thereby preventing the pressure from exceeding the value of 60 bars in the duct portion B12.

The reducer 22 thus enables a large pressure difference to be established between the second enclosure 162B of the second elementary motor (connected to the second main port of the pump) and the first enclosure 162A. It thus enables the second elementary motor to apply significant braking torque to the left rear wheel.

Finally, the check valve 24 disposed on the duct B12 prevents fluid from flowing through that duct from the enclosure 162A towards the enclosure 162B via the distributor 21 and the duct B10. Thus, the valve 24 prevents the motor 16 and thus the wheel to which the motor is connected from rotating in the direction opposite to the normal direction (in which the fluid passes through the motor 16 from the first enclosure towards the second enclosure).

FIG. 3 shows a third embodiment of hydrostatic transmission apparatus 210 of the invention. The apparatus 210 is arranged in the same manner for the left portion and for the right portion of the vehicle on which it is arranged; therefore, the description is given only for the components that are used for the left portion of the vehicle.

The apparatus 210 is substantially identical to the apparatus 110, except for certain differences that are explained below.

The first difference is that, in the apparatus 210, each of the motors 46 and 56 driving the rear wheels comprises three elementary motors (461, 462, 463; 561, 562, 563) instead of two elementary motors in the motors 16 and 36. Each of these elementary motors has two feed/discharge enclosures, the first enclosures, which are the feed enclosures when the vehicle is advancing normally, have the same references as their respective elementary motors followed by the letter "A", and the second enclosures, which are the discharge enclosures when the vehicle is advancing normally, having the same references as their respective elementary motors followed by the letter "B".

The elementary motors 461 and 462 are the first and second elementary motors in the meaning of the invention. The motor 463 is thus an additional elementary motor relative to the preceding embodiments, thereby making it possible to obtain a difference in cylinder capacity, and thus in speed, that is larger between the work mode and The first enclosures 461A and 463A of the motors 461 and 463 are connected together and are connected to the port A of a two-position distributor 221 that is part of the isolation means 220 in the meaning of the invention.

The second enclosure 461B of the motor 461 is connected in series by a series duct S1 to the first enclosure 14A of the first motor 14.

The second enclosure 463B of the motor 463 is connected to a junction T1 situated in the motor 46, which makes it possible to direct the fluid via a flow divider 230 (described below) to the port 12B of the pump 12.

The first and second enclosures 462A and 462B of the motor 462 are connected respectively to the first port 12A of the pump 12 and to the above-mentioned junction T1.

Thus, the elementary motors 462 and 463 are arranged in two circuits F2 and F3 that are connected in parallel to the main ports of the pump, whereas it is the elementary motor 461 and the first motor 14 connected together in series that are also connected in parallel to the main ports of the pump and that form the third circuit F1.

The circuit F2 interconnects the main ports of the pump continuously (i.e. both in road mode and in work mode).

Conversely, because of the distributor 221, the circuits F1 and F3 can be bypassed, thereby enabling the apparatus to be put into road mode. The distributor 221 includes an upstream port A (connected to the enclosures 461A and 463A), a downstream port B connected to the junction T1 via a bypass duct B210, and a downstream port C connected to the port 12A of the pump. The distributor 221 has two positions, in which it enables the port A to be put into communication with one or the other of the main ports of the pump via respective ones of the ports B or C.

When the port A is put into communication with the port 12A (delivery port of the pump), the apparatus is in work mode. The delivery pressure is applied to the first three enclosures of the elementary motors of the motor 16, and the three circuits F1 to F3 are active.

Conversely, when the port A is put into communication with the port 12B, the apparatus is in road mode. The circuits F1 and F3 are bypassed, and only the motor 462 of the circuit F2 serves to drive the vehicle.

It should be noted that, in this embodiment, the feed first enclosure is the first enclosure 462A of the second elementary motor 462. It is different from the arrangement of the apparatus 10 (FIG. 1), in which the feed first enclosure was the first enclosure 161A of the first elementary motor 161.

As in the apparatus 110, the apparatus 210 includes a pressure reducer 222, interposed on the bypass duct B210.

Another specificity of the apparatus 210 is the flow divider 230. The flow divider serves to prevent a wheel from starting to rotate in the reverse direction during braking, usually when going downhill, making the apparatus uncontrollable.

As has been indicated, the second enclosures 462B and 463B of the second and third elementary motors 462 and 463 of the motor 46, and the port B of the distributor 221, are connected to the junction T1 of the motor and, from there, to the port 12B of the pump.

To this end, the junction T1 is connected via a duct G1 to an inlet port A of the flow divider 230. A symmetrical arrangement exists in the right rear motor 56, that has a junction T2 connected via a duct G2 to an inlet port B of the flow divider 230.

The flow divider 230 has a third port C enabling fluid to exit towards that port 12B of the pump to which it is connected.

The role of the flow divider 230 is as follows:

The flow divider 230 constrains the flow rates passing through its ports A and B to be mutually equal. The flow rates in the ducts G1 and G2, and therefore in the motors 46 and 56 are thus constrained to be mutually equal. Therefore, in a braking situation, it can be excluded that a situation might arise in which a rear wheel is rotating in the direction opposite to the normal forward direction (under the effect of the braking torque from the motor) while the other wheel is rotating in the normal direction. This means that it is almost impossible for a wheel to start rotating in the direction opposite to the forward direction during a braking situation, since the driving torque of the other wheel is almost always significantly higher than the opposite braking torque applied by the motor(s).

An additional specificity of the apparatus 210 lies in the arrangement and in the operation of an exchange valve circuit 240 that is incorporated into the apparatus 210. The use of an exchange valve circuit in a Twin-lock apparatus is known per se. Such a circuit has two inlet ports A and B connected to respective ones of the two ports 12A and 12B of the pump, and an outlet port E connected to an overpressure-free reservoir 248 (maintained substantially at atmospheric pressure). In this example, the circuit 240 includes a three-position exchange valve 242 controlled by two opposing hydraulic control chambers 242A and 242B, a controllable blocking solenoid valve 244 constituting the above-mentioned blocking means for blocking off the exchange valve circuit, and a pressure limiter 246. The inlet ports A and B of the apparatus 240 are the inlet ports of the exchange valve 242.

The chambers 242A and 242B are connected to respective ones of the ports 12A and 12B of the pump. Thus, the relative pressures of the fluid in these ports determine the position of the valve 242: if they are mutually equal, the valve 242 is in the middle position and isolates the ports. Otherwise, the valve 242 puts that port of the pump that has the lower pressure into communication with its outlet port C that is connected to the inlet port D of the valve 244.

Under normal circumstances, the valve 244 is open and allows fluid to flow through it and puts its inlet port D into communication with its outlet port E that is connected to the inlet port F of the flow limiter 246. Whenever the pressure in the inlet port F of the limiter 246 exceeds the pressure rating of said limiter, said limiter removes fluid from said port F to the overpressure-free reservoir 248, via its outlet port G that constitutes the outlet port G of the exchange valve circuit 240. Thus, under normal circumstances, the exchange valve circuit removes a fraction of the fluid flowing through the main closed circuit to the reservoir 248, said fraction of fluid then being re-injected into the closed circuit by a booster pump that is not shown. This causes forced cooling of the fluid flowing around the closed circuit.

Conversely, in a braking situation, the valve 244 is activated and placed in an isolation position, in which it prevents any removal of fluid from the valve 242 to the reservoir 248. Thus, advantageously, the valve 244 constitutes activatable blocking means 244 for blocking the exchange valve 240, which means are suitable for preventing fluid from being removed by the pump when they are activated. The valve 244 is activated during braking stages because, during such stages, in known manner, there is a risk that the wheels might lock. By means of the valve 244 (and particularly but not necessarily in combination with the flow divider 230), all of the fluid delivered by the pump is constrained to pass through the motors: this thus forces the wheels to have a certain speed, and therefore and advantageously constitutes anti-lock apparatus for preventing the wheels from locking.

FIG. 4 shows a variant 310 of the apparatus 210 of FIG. 3.

The difference between the apparatus 310 and the apparatus 210 is that the apparatus 310 is arranged to drive three wheels rather than being arranged to drive four wheels. To this end, instead of including first and fourth motor motors (14 and 34) at the front for driving the front wheels, it has only one motor at the front, namely the motor 44.

In the apparatus 110, the series ducts S1 and S2 of the circuits E1 and E2 are connected to respective ones of the first enclosures 14A and 34A of the first and of the first and fourth motor 14 and 34. Conversely, in the apparatus 210, both of the series ducts S1 and S2 are connected, via a junction R and via a common segment S3, to the first enclosure 44A of the motor 44, the second enclosure 44B being connected to the port 12B of the pump.

FIG. 5 shows a variant 410 of the apparatus 310 of FIG. 4.

The difference between the apparatus 410 and the apparatus 310 lies essentially in the type of motor that is used for driving the front wheel. Instead of the front wheel being driven by a single motor, such as the motor 44 of the apparatus 310, in the apparatus 410 the front wheel is driven by a double motor 54. This motor comprises two elementary motors 541 and 542. The feed ports 541A and 542A of these two elementary motors are connected to respective ones of the second enclosures 461B and 561B of the elementary motors 461 and 561, via series ducts S1 and S2. The discharge ports 541B and 542B of the two elementary motors are connected to each other and to the admission port 12B of the pump. This embodiment illustrates the fact that, in the meaning of the invention, rather than being a single motor, the first hydraulic motor may be an elementary motor that is part of a multiple motor, as applies to the elementary motor 541 in the motor 54.

Finally, FIG. 6 shows an alternative version 342 of the valve 242. Like the valve 242, the valve 342 makes it possible, in co-operation with the valves 244 and 246, to provide the exchange function for the exchange valve circuit 240, when the pressure prevailing in the delivery port 12A of the pump is sufficiently high. Unless otherwise indicated, the valve 342 is identical to the valve 242.

The specificity of the valve 342 is that it has two positions only. Its slide is controlled only by the pressure of a hydraulic chamber, namely the chamber 342A. The valve 342 does not have a second hydraulic control chamber. As a result, when the pressure in the admission port 12B of the pump rises, during operation in reverse, while going downhill, or during braking, the valve 342 is placed in its isolation position and prevents any exchange of fluid. Naturally, this embodiment is usable only insofar as, during such reverse, downhill, or braking stages, the hydraulic fluid is not subjected to increases in temperature that are too large and that might damage certain components. During these stages, as indicated above, the fluid is not cooled by the exchange valve circuit 240.

The invention claimed is:

1. Hydrostatic transmission apparatus including:
   a hydraulic pump with two main ports;
   a first hydraulic motor; and
   a second hydraulic motor including at least a first elementary motor and a second elementary motor, each elementary motor and the first motor having first and second enclosures for feeding fluid to the motor and for discharging fluid therefrom;
   the apparatus has at least two operating modes referred to as work mode and road mode, in which modes:
   the second enclosure of the first elementary motor of the second motor and the first enclosure of the first motor are connected together in series via a first series duct, the second enclosure of the first motor being connected to a second main port of the pump; and
   the second enclosure of the second elementary motor of the second motor is connected to the second main port of the pump;
   in which the apparatus, in the work mode, the first enclosure of each of the two elementary motors of the second motor is connected to a first main port of the pump;
   wherein the apparatus has an isolation valve device that, when in the road mode, is suitable for:
   isolating the first enclosures of the first and second elementary motors of the second motor from each other;
   putting one of said first enclosures referred to as a feed first enclosure into communication with the first main port of the pump in such a manner as to feed one of the elementary motors of the second motor; and
   putting another one of said first enclosures, referred to as a bypass first enclosure, into communication with the second main port of the pump via a first bypass duct in such a manner as to bypass another one of the elementary motors of the second motor.

2. Apparatus according to claim 1, wherein the isolation valve device includes a two-position controllable distributor that is arranged in such a manner as to make it possible to connect the bypass first enclosure selectively to one or to the other of the ports of the pump, depending on whether the apparatus is in the work mode or in the road mode.

3. Apparatus according to claim 2, wherein the distributor has three ports, namely a downstream port connected to a first port of the second elementary motor, and two upstream ports that are connected to respective ones of the two main ports of the pump via respective connection ducts.

4. Apparatus according to claim 1, wherein the feed first enclosure is the first enclosure of the first elementary motor.

5. Apparatus according to claim 1, wherein the feed first enclosure is the first enclosure of the second elementary motor.

6. Apparatus according to claim 1, wherein:
   the second motor further includes a third elementary motor having feed/discharge first and second enclosures;
   the first enclosure of the third elementary motor is connected to the first enclosure of the first elementary motor; and
   the second enclosure of the third elementary motor is connected to the second main port of the pump.

7. Apparatus according to claim 1, further including a pressure reducer interposed on the first bypass duct and that prevents pressure from rising in a portion of said first bypass duct that is connected to the second main port of the pump.

8. Apparatus according to claim 1, further including a check valve interposed on the first bypass duct and that prevents fluid from flowing in said first bypass duct coming from the bypass first enclosure.

9. Apparatus according to claim 1, further including:
   a third hydraulic motor including at least a first elementary motor and a second elementary motor, each elementary motor having first and second enclosures for feeding fluid to the motor and for discharging fluid therefrom;
   in which apparatus, both in the work mode and in the road mode:
   the second enclosure of the second elementary motor of the third motor is connected to the second main port of the pump;
   in the work mode, the first enclosure of each of the two elementary motors of the third motor is connected to the first main port of the pump;
   in the road mode, the isolation valve device is suitable for:
   isolating the first enclosures of the first and second elementary motors of the third motor from each other, and, simultaneously,
   putting one of said first enclosures of the first and second elementary motors of the third motor, referred to as a feed first enclosure of the third motor, into communication with the first main port of the pump in such a manner as to feed one of the first and second elementary motors of the third motor; and
   putting another one of said first enclosures of the first and second elementary motors of the third motor, referred to as a bypass first enclosure of the third motor into communication with the second main port of the pump via a second bypass duct in such a manner as to bypass another one of the first and second elementary motors of the third motor.

10. Apparatus according to claim 9, wherein the second enclosure of the first elementary motor of the third motor and the first enclosure of the first motor are interconnected in series via a second series duct.

11. Apparatus according to claim 9, further including a fourth motor having first and second enclosures for feeding fluid to the motor and for discharging fluid therefrom, and wherein the second enclosure of the first elementary motor of the third motor and the first enclosure of the fourth motor are connected together in series via a second series duct, the second enclosure of the fourth motor being connected to the second main port of the pump.

12. Apparatus according to claim 9, further including a flow divider having two inlet ports and one outlet port, the two inlet ports being connected to the second enclosures of the second elementary motor of the second and third motors respectively, and the outlet port being connected to the second main port of the pump, the flow divider being arranged in such a manner as to constrain fluid to flow at an equal flow rate through each of its two inlet ports.

13. Apparatus according to claim 9, further including a flow divider having one inlet port and two outlet ports, the two outlet ports being connected, in the work mode, to the first enclosures of the first and second elementary motors respectively of the second and third motors, and the inlet port being connected to the first main port of the pump, the flow divider being arranged in such a manner as to constrain fluid to flow at an equal flow rate through each of its two outlet ports.

14. A vehicle including a rear vehicle mover member and a front vehicle mover member, and the apparatus according to claim 9, wherein said first motor is coupled to the front vehicle mover member; and said second motor is coupled to the rear vehicle mover member.

15. Apparatus according to claim 1, further including an exchange valve circuit having two inlet ports and one outlet port, the two inlet ports being connected to the two main ports of the pump, the outlet port being connected to an overpressure-free reservoir, an exchange valve being suitable for directing fluid to the overpressure-free reservoir that is coming from the one of the main ports of the pump that is at a lower pressure, if the pressure of said fluid exceeds a predetermined value;

the apparatus further including an activatable blocking valve device for blocking the exchange valve, the blocking valve device being suitable for preventing the fluid from being removed from the pump when the blocking valve device is activated.

16. A vehicle including a rear vehicle mover member and a front vehicle mover member, and the apparatus according to claim 1, wherein said first motor is coupled to the front vehicle mover member; and said second motor is coupled to the rear vehicle mover member.

17. Apparatus according to claim 1, wherein the first main port of the pump is the delivery port of the pump.

18. Apparatus according to claim 1, wherein the second hydraulic motor is a motor having four external couplings.

19. Apparatus according to claim 1, wherein the second hydraulic motor has an output shaft, and the first elementary motor and the second elementary motor of the second hydraulic motor are both coupled to the output shaft.

* * * * *